US012438572B2

(12) United States Patent
Frederick (10) Patent No.: US 12,438,572 B2
(45) Date of Patent: Oct. 7, 2025

(54) INTEGRATED NOISE-CANCELING RFID RECEIVER

(71) Applicant: Clairvoyant Technology, Inc., Durham, NC (US)

(72) Inventor: Thomas J. Frederick, Chapel Hill, NC (US)

(73) Assignee: Clairvoyant Technology, Inc., Durham, NC (US)

( * ) Notice: Subject to any disclaimer, the term of this patent is extended or adjusted under 35 U.S.C. 154(b) by 337 days.

(21) Appl. No.: 18/036,829

(22) PCT Filed: Nov. 12, 2021

(86) PCT No.: PCT/US2021/059060
§ 371 (c)(1),
(2) Date: May 12, 2023

(87) PCT Pub. No.: WO2022/108835
PCT Pub. Date: May 27, 2022

(65) Prior Publication Data
US 2023/0421204 A1    Dec. 28, 2023

Related U.S. Application Data

(60) Provisional application No. 63/116,438, filed on Nov. 20, 2020.

(51) Int. Cl.
*H04B 5/00* (2024.01)
*G06K 7/10* (2006.01)
*H04B 5/77* (2024.01)

(52) U.S. Cl.
CPC ........... *H04B 5/77* (2024.01); *G06K 7/10366* (2013.01)

(58) Field of Classification Search
None
See application file for complete search history.

(56) References Cited

U.S. PATENT DOCUMENTS

2006/0183454 A1    8/2006    Al-Mahdawi
2008/0100439 A1    5/2008    Rinkes
(Continued)

FOREIGN PATENT DOCUMENTS

WO    2019125803 A1    6/2019

OTHER PUBLICATIONS

PCT App. No. PCT/US2021/057685, "International Search Report and Written Opinion", Feb. 1, 2022, 8 pages.
(Continued)

*Primary Examiner* — Frantz Bataille
(74) *Attorney, Agent, or Firm* — Kilpatrick Townsend & Stockton, LLP (57) ABSTRACT

Aspects and features of this disclosure include an RFID reader with an integrated noise-canceling RFID receiver. The receiver includes a baseband converter configured to receive an RFID signal and a cancelation signal. The baseband converter acts as a received signal mixer and also provides noise cancelation using the cancelation signal. A modulated feedback signal completes closed-loop signal path that automatically provides noise control, both noise shaping and noise filtering, improving the receiving performance by efficiently reducing or eliminating noise that would otherwise be produced by the transmitter of the RFID reader.

20 Claims, 8 Drawing Sheets

(56) References Cited

U.S. PATENT DOCUMENTS

| | | | |
|---|---|---|---|
| 2008/0238622 A1* | 10/2008 | Rofougaran | H04B 5/22 |
| | | | 375/371 |
| 2013/0316659 A1 | 11/2013 | Ylamurto | |
| 2014/0140250 A1 | 5/2014 | Kim et al. | |
| 2015/0288380 A1 | 10/2015 | Zhao et al. | |
| 2017/0180166 A1* | 6/2017 | Zhou | H04B 1/525 |
| 2019/0236323 A1 | 8/2019 | Trivelpiece et al. | |
| 2020/0193365 A1 | 6/2020 | Trivelpiece et al. | |

OTHER PUBLICATIONS

PCT App. No. PCT/US2021/059060, "International Search Report and Written Opinion", Apr. 26, 2022, 11 pages.
PCT App. No. PCT/US2021/059060, "Invitation to Pay Additional Fees and, Where Applicable, Protest Fee", Jan. 26, 2022, 2 pages.

* cited by examiner

INTEGRATED NOISE-CANCELING RFID RECEIVER

CROSS-REFERENCE TO RELATED APPLICATION

This application claims priority to U.S. Provisional Patent Application 63/116,438, filed Nov. 20, 2020, the entire disclosure of which is incorporated herein by reference.

TECHNICAL FIELD

The present disclosure relates generally to radio frequency identification (RFID) systems. More particularly, though not exclusively, the present disclosure relates to a noise-canceling integrated receiver for an RFID reader.

BACKGROUND

RFID systems include, at least, an RFID reader and an antenna. The antenna is used by the reader to transmit interrogation signals to RFID tags and receive responses from the RFID tags. The reader includes both a transmitter for the transmitted interrogation signals and a receiver for receiving signals modulated with responses from the RFID tags. The cost and size of RFID tags continues to drop; however, RFID readers remain relatively large and expensive. Part of the reason for the size and expense of RFID readers is that the receiver within the RFID reader is subject to interference from the reader's own transmitter, creating an acute need for noise reduction and interference cancelation, which in turn increases the cost and complexity of the receiver to be included within an RFID reader.

SUMMARY

Aspects and features of this disclosure include an integrated noise-canceling RFID receiver. The RFID receiver includes a baseband converter configured to receive an RFID signal and a cancelation signal. The baseband converter provides receive mixing and noise cancelation to produce an analog baseband signal. A summer is communicatively coupled to the baseband converter and is configured to receive the analog baseband signal and a modulated feedback signal. A quantizer is communicatively coupled to the summer to produce a digital baseband signal corresponding to the RFID signal, providing closed-loop noise control based on the modulated feedback signal.

Aspects and features of this disclosure also include an RFID reader. The RFID reader includes the integrated noise-canceling RFID receiver. The RFID reader further includes an antenna connection, a modem to modulate a transmitted RFID signal and demodulate a received RFID signal, and a transmit mixer communicatively coupled to the modem. The RFID reader also includes a radio frequency power amplifier communicatively coupled between the transmit mixer and an antenna connection.

In some examples, aspects and features include a delta-sigma modulator communicatively coupled between the summer and the quantizer to modulate a signal fed back from the quantizer and provide the modulated feedback signal. In some examples, the baseband converter is configured to receive a clock cancelation control signal and to use the clock cancelation control signal and a clock signal to provide cancelation signal phase shifting.

Aspects and features of this disclosure also include a method of processing an RFID signal. The method includes receiving the RFID signal through an antenna connection, and mixing the RFID signal with a local oscillator signal and a cancellation signal to produce baseband in-phase and quadrature-phase analog signals. The method further includes summing the baseband in-phase and quadrature-phase analog signals with a modulated feedback signal to produce in-phase and quadrature-phase summed signals, and optimizing a signal-to-noise ratio for the in-phase and quadrature-phase summed signals. The method further includes quantizing the in-phase and quadrature-phase summed signals to provide in-phase and quadrature-phase digital signals representing the received RFID signal.

DETAILED DESCRIPTION

Certain aspects and features of the present disclosure relate to an RFID reader with an improved, more efficient RFID receiver. This integrated noise-canceling RFID receiver includes circuits for carrier cancelation, mixing, down-conversion, and baseband quantization that have been arranged and combined in order to provide a more efficient design than is available with more discretely-arranged receiver designs. The integrated noise-canceling RFID receiver is less subject to interference and noise from the reader's own transmitter. The receiver also features improved linearity, improved frequency selectivity and lower power consumption as compared to receivers that require low noise amplifiers and/or active mixers.

Certain aspects and features of the present disclosure provide an RFID receiver including a baseband converter configured to receive an RFID signal and a cancelation signal. The baseband converter acts as a received signal mixer and also provides noise cancelation using the cancelation signal. A summer receives the signal from the baseband converter as well as a modulated feedback signal produced by converting the baseband digital output signal of the receiver back to analog. The feedback signal completes a closed-loop signal path that automatically provides noise control, both noise shaping and noise filtering, improving the receiving performance by reducing or eliminating noise that would otherwise be produced by the co-located transmitter of the RFID reader.

In some examples, the cancelation signal is produced by a transmit sense circuit in the RFID reader. The transmit sense signal produces a replica of the transmit signal. A signal adjuster coupled to the transmit sense circuit automatically adjusts the amplitude and phase of the replica to produce the cancelation signal. In some examples, the baseband converter includes a multi-phase, switched integration mixer, which performs a direct conversion from radio frequency (RF) to baseband. In one example, the baseband converter includes multi-phase, switched integrators to translate both the received signal and the adjusted transmit signal replica to baseband and then subtract one from the other in baseband. The apparatus and/or methods according to aspects of this disclosure can significantly improve the linearity and dynamic range of backscatter RFID receivers.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

Figure 1:
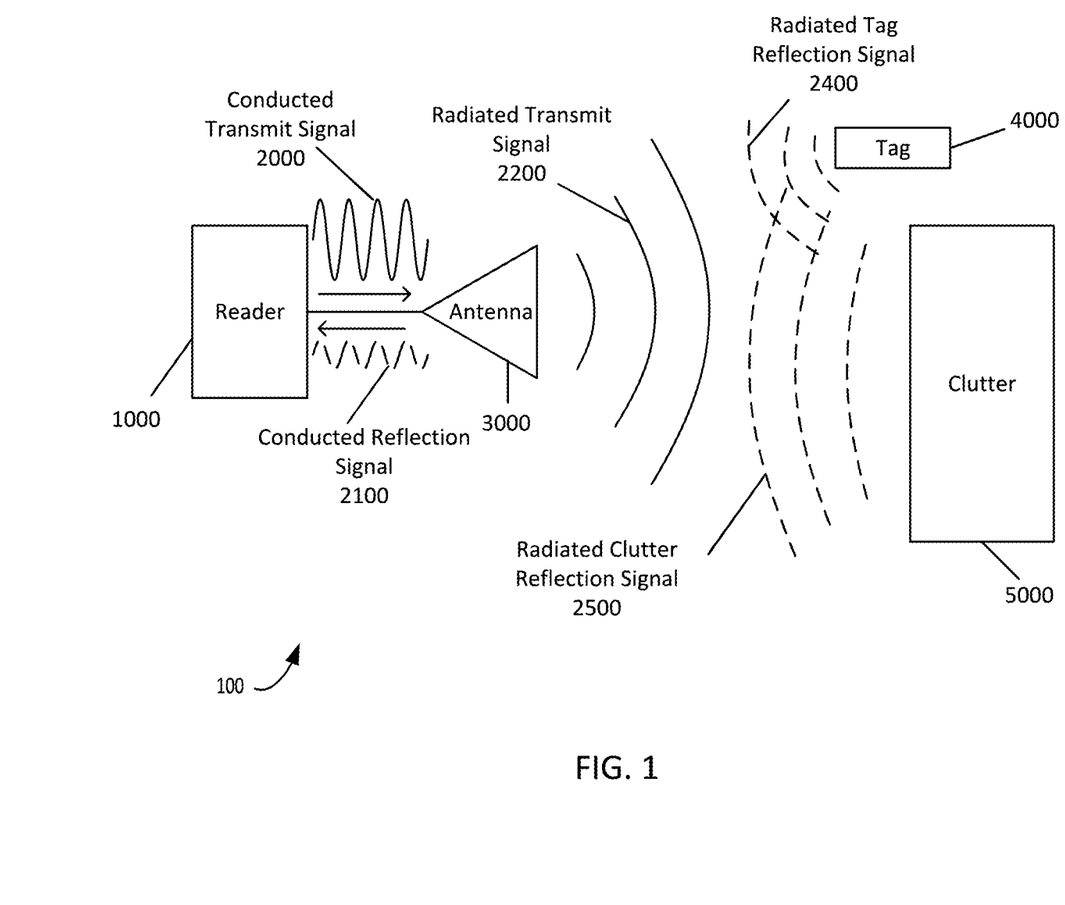
FIG. 1 is a block diagram of an operating environment for an RFID system including an RFID reader with a receiver according to certain aspects of this disclosure.

FIG. 1 shows a block diagram of an operating environment 100 for an RFID system including an RFID reader with a receiver according to certain aspects of this disclosure. RFID reader 1000 sends a transmit RF signal 2000 through some waveguide to an antenna 3000. The waveguide is typically a coaxial cable. With reference to the disclosed examples, the term "RF" may refer to the UHF band, such as 867 MHz or 915 MHz, or the microwave band, such as 2.4 GHz or 5.8 GHz. In general, the term "RF" refers to systems and methods, which use electromagnetic energy at frequencies where far-field effects dominate in typical environments, as opposed to inductive or other systems, which are near-field based. Such frequencies, for example, may be those over 100 kHz, but would typically be at least 300 MHz. Due to impedance mismatch between the coaxial cable and the antenna, some portion of the conducted transmit signal is reflected back into the reader and is shown in FIG. 1 as the conducted reflection signal 2100.

In some examples, the reader 1000 in FIG. 1 may use separate transmit and receive antennas, or multiple antennas, or various other antenna arrangements. The transmit signal couples into the receiver via paths within the reader circuitry. There may be coupling between transmit and receive antennas and reflections within the RFID environment. Despite such coupling and/or reflections, the examples disclosed herein may be used to cancel or reduce the carrier signal conducted into the receiver of an RFID reader.

The radiated transmit signal 2200 in FIG. 1 is the portion of the transmit signal not reflected into the reader from the antenna. This radiated transmit signal may be said to illuminate the interrogation zone so that any RFID tags within the interrogation zone are activated and respond to commands from the RFID reader 1000. FIG. 1 shows an RFID tag 4000, which will communicate back to the reader 1000 by backscatter modulation, producing a modulated tag signal 2400, which can propagate back toward the antenna 3000. Within the interrogation zone there are also generally other objects, which produce reflections back toward the antenna. FIG. 1 shows an object 5000 producing a clutter-reflected signal 2500, which propagates back toward the antenna 3000.

Still referring to FIG. 1, the reflected signals 2400 and 2500 are converted by the antenna into electrical signals, which are conducted back through the waveguide to the reader 1000. Of the signals being conducted into the reader, the transmit signal reflected from the antenna due to impedance mismatch is generally much higher power than the reflected signals 2400 and 2500. For example, if the reader's conducted transmit signal 2000 is 1 watt, or +30 dBm, and the return loss of the antenna is 15 dB, then the conducted reflected signal 2100 would be +15 dBm. However, reflected tag signals 2400, which are converted by the antenna 3000 into conducted electrical power typically result in signal levels from −35 dBm at the strongest to −75 dBm or even lower in some cases. Similarly, the clutter reflected signals 2500 typically result in signals with conducted electrical power of −10 dBm or lower. Therefore, the reflected transmit signal 2100 due to the antenna impedance mismatch is typically at least two orders of magnitude more powerful than any of the radiated reflected signals. Aspects and features of this disclosure can significantly improve the linearity and dynamic range of backscatter RFID reception by partially or completely canceling reflected transmit signal 2100 in the reader.

Figure 2:
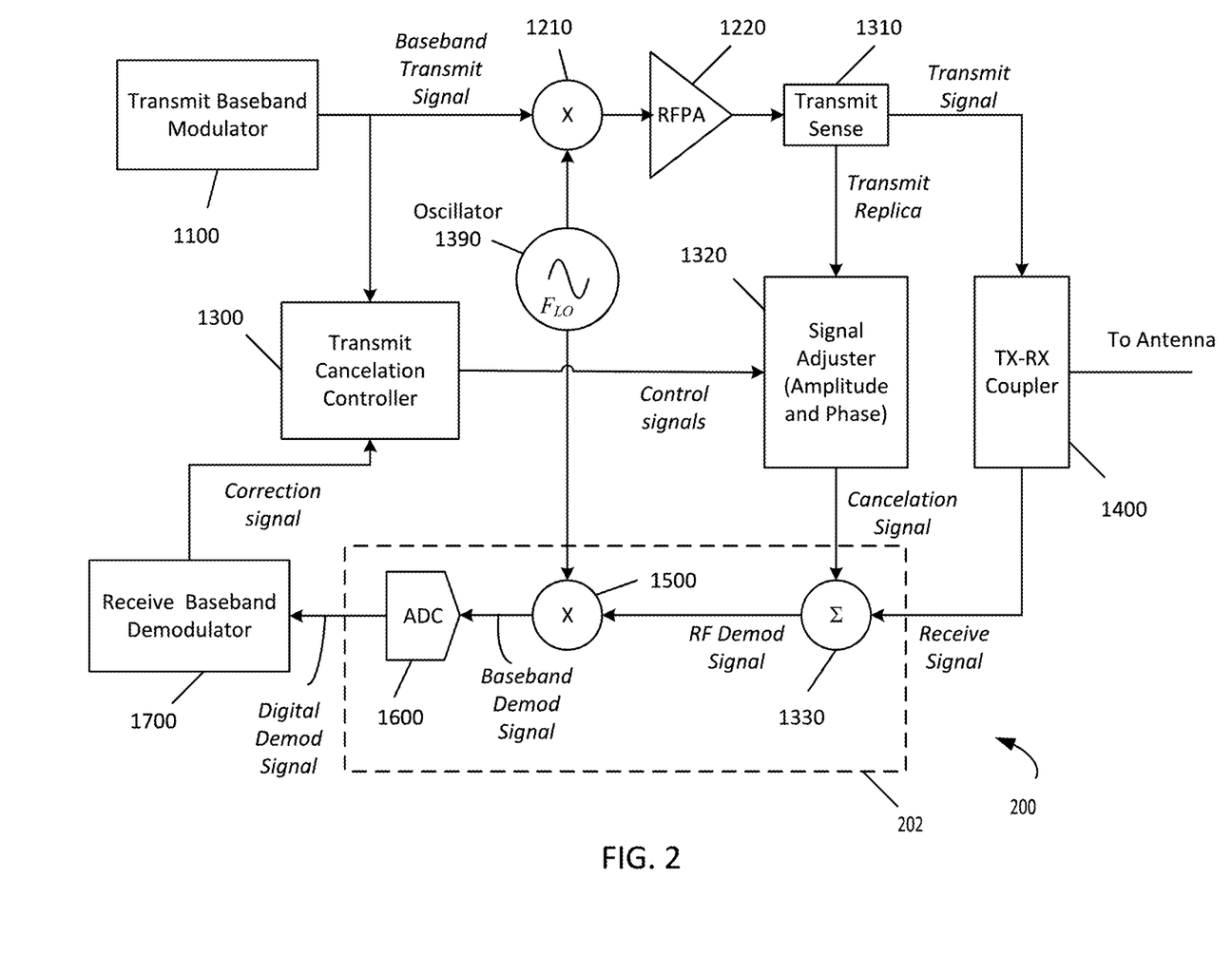
FIG. 2 is a block diagram of one example of an RFID reader according to aspects of this disclosure.

FIG. 2 is a block diagram of one example of an RFID reader 200 according to aspects of this disclosure. In FIG. 2, only portions relevant to the modem and radio portions of the reader are shown. The modem in this example, includes a transmit baseband modulator 1100 and a receive baseband demodulator 1700. The modem takes data packets from the higher layers of the reader and coverts them to waveforms suitable for transmission. The modem also receives baseband demodulator input signals from the receiver and demodulates those waveforms into data packets, which are passed to the higher layers of the RFID reader.

The transmit baseband modulator 1100 sends baseband waveform signals to the transmitter up-conversion mixer 1210, which translates the baseband signal to RF. The transmit mixer output is passed to the RF power amplifier (RFPA) 1220. The RFPA produces a high-power output, typically around one watt, which is used to drive an antenna. The TX-RX (transmit-receive) coupler 1400 interconnects the transmit path and the receive path with a single antenna connection to the line as labeled "To Antenna" in FIG. 2. Nearly all of the signal power from the transmit path is directed toward the antenna, while nearly all the receive signal power from the antenna is passed into the receiver as the receive signal as shown in FIG. 2. The TX-RX coupler 1400 can be based on a circulator, directional coupler, lumped-element circuitry, or another suitable circuit topology.

The transmit sense circuit 1310 takes a small portion of the transmit signal and passes it to the replica signal adjustment circuit 1320, also referred to as a signal adjuster, which provides amplitude and phase adjustment for the replicated transmit signal. The transmitter sense circuit 1310 in one example is a directional coupler with a coupling factor of around 10 dB. For example, if the RFPA produces one watt and the sense circuit 1310 is a 10 dB directional coupler, then the transmit replica signal in FIG. 2 is 100 mW, and the mainline transmit signal path to the TX-RX coupler 1400 would ideally be 900 mW. There are other possible circuits to implement the sense function 1310, such as a resistive, inductive, or capacitive coupling circuit.

The integrated noise-canceling RFID receiver 202 of reader 200 provides the functions of a self-interference cancellation, a summing circuit 1330, a receive mixer 1500, and an analog-to-digital converter (ADC) 1600, also referred to as a digitizer. The self-interference cancellation system in FIG. 2 includes the transmit cancelation controller 1300, the transmit sense circuit 1310, the replica signal adjustment circuit 1320, and the summing circuit 1330. The transmit cancelation controller is communicatively coupled between the modem and the signal adjuster. The operation of this system is based on a small portion of the transmit signal sampled by the sense circuit 1310 being passed to the adjustment circuit 1320. The adjustment circuit changes the amplitude and phase of the transmit replica signal to produce a cancellation signal, shown in FIG. 2. The cancellation signal is summed with the receive signal to reduce the self-interference noise coupled into the receiver from circuit, antenna, and clutter reflections as discussed regarding FIG. 1. The amplitude and phase of the cancellation signal are adjusted to match the amplitude of the self-interference and to be 180 degrees out of phase with the self-interference, respectively.

Figure 5:
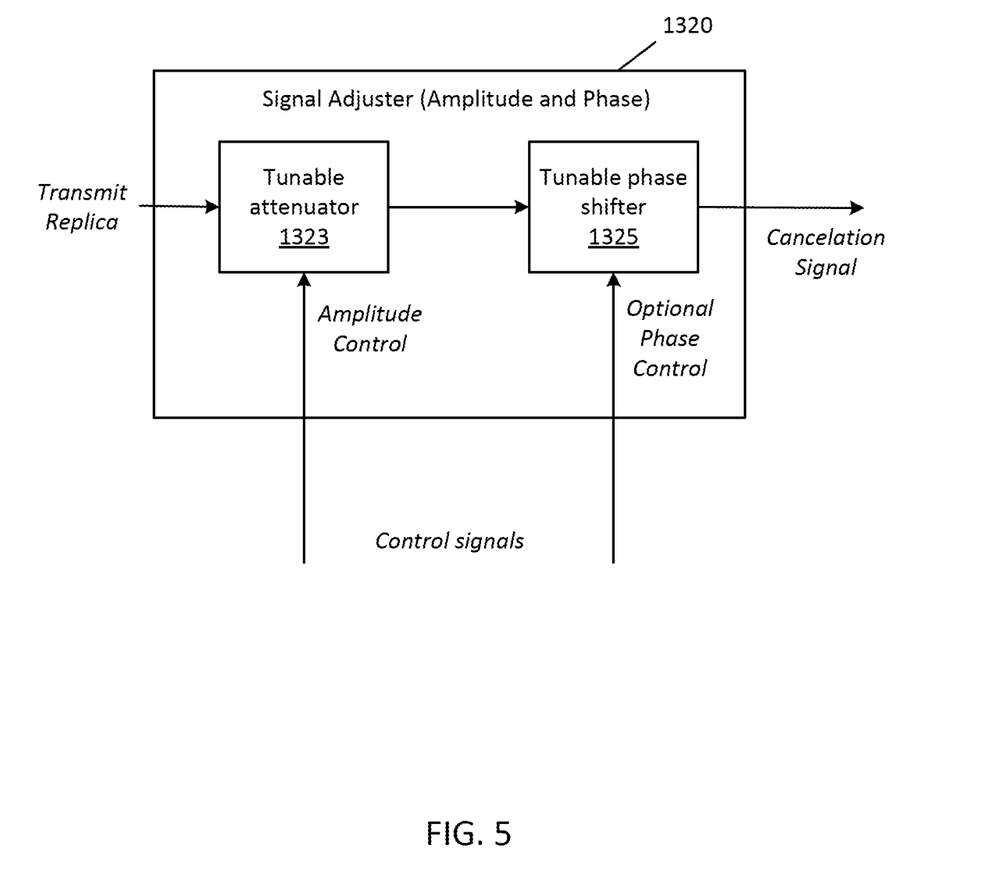
FIG. 5 is a block diagram of one example of a phase adjustment circuit that can be used in an RFID reader according to aspects of this disclosure.

The replica signal adjustment circuit 1320 is described in more detail with respect to FIG. 5. The cancellation summing circuit in one example is an RF combiner such as a Wilkinson power combiner, though there are other possibilities. One disadvantage in this example is the inherent insertion loss in the summer based on an RF power combiner topology. The transmit cancelation controller 1300 takes the baseband transmit signal and the correction signal from the receive baseband demodulator. The correction signal can be a filtered version of the digital demodulation (demod) signal in FIG. 2. The correction signal contains information about un-canceled self-interference in the receive signal. The transmit cancelation controller 1300 may cross-correlate the baseband transmit and correction signal to develop corrections needed to its output control values. The transmit cancelation controller 1300 produces output signals to control the amplitude and phase adjustment made by signal adjuster 1320.

FIG. 2 shows radio frequency oscillator 1390 providing a local oscillator output ($F_{LO}$) used by the transmit and receive mixers to perform direct conversion, up- and down-mixing to and from baseband. The receive mixer 1500 translates the RF demod signal to the baseband demod signal. The baseband signal is sampled and quantized by the digitizer 1600, and the digital demod signal is passed into the demodulator 1700.

Figure 3:
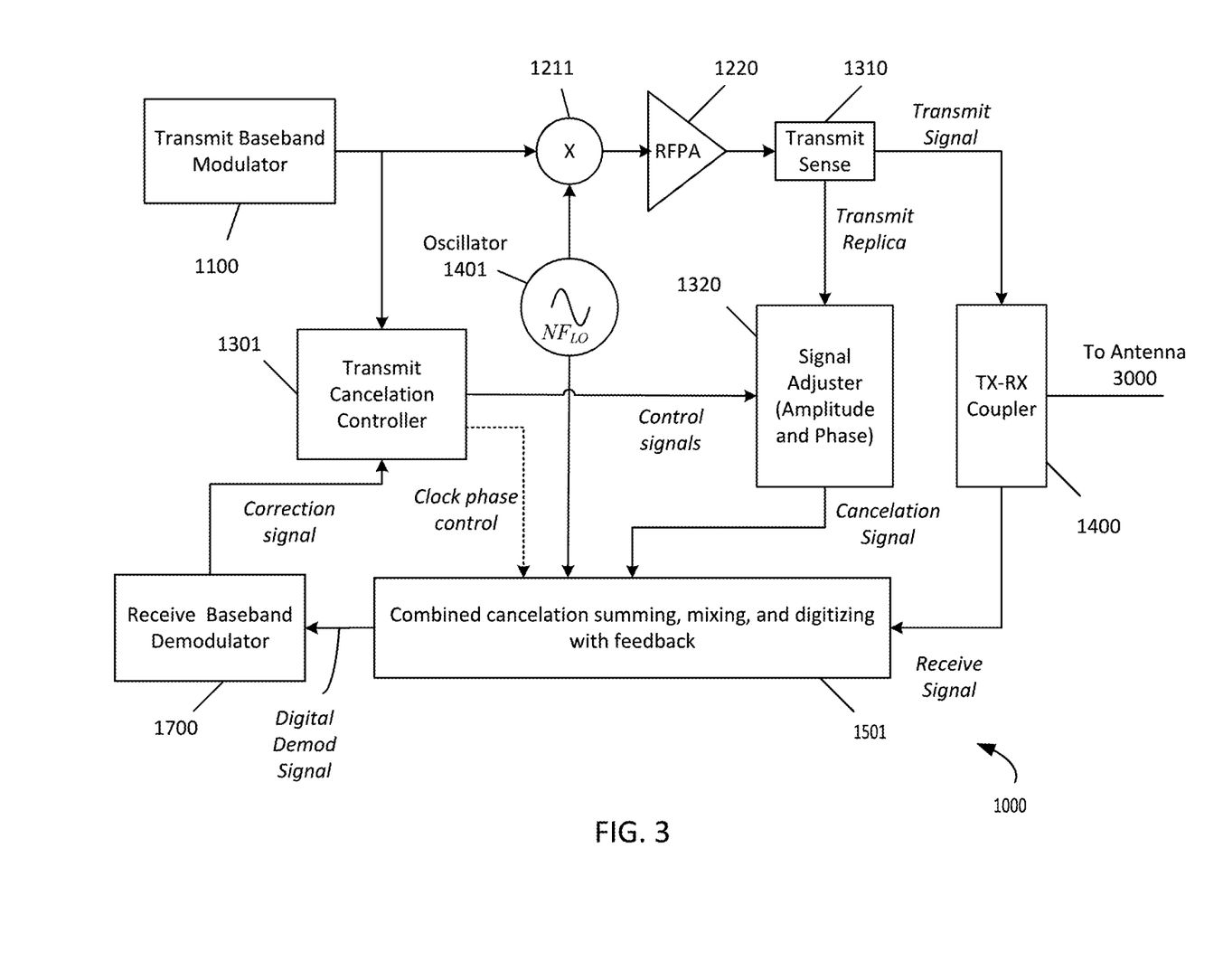
FIG. 3 is a block diagram of another example of an RFID reader according to aspects of this disclosure.

FIG. 3 is a block diagram of an example of the RFID reader 1000 according to aspects of this disclosure. FIG. 3 shows an example of the integrated receiver 1501, wherein the external features of the summing circuit 1330, which can also provide signal cancelation, receive mixer 1500, and ADC 1600 are combined in a single integrated receive circuit using a multiphase, switched, integrate-and-hold mixer circuit with quantization and delta-sigma modulation feedback. In this case, the oscillator 1401 provides a local oscillator output ($NF_{LO}$) with an even integer number "N" of non-overlapping clock phases, where N is greater or equal to 4. When N=4, the baseband result is effectively a quadrature down conversion with in-phase and quadrature-phase components. The transmit mixer 1211 may optionally be implemented differently than previously described given the multiphase oscillator 1401 available in this design, though there is no dependence between the transmit mixer 1211 and the integrated receiver 1501. For the transmit mixer, a conventional mixer such as mixer 1210 could also be adapted. The integrated noise-canceling RFID receiver 1501 is capable of optionally providing a cancellation signal phase shifting via oscillator phase/timing adjustment. To facilitate this adjustment, transmit cancelation controller 1301 optionally provides a clock phase control signal to the integrated receiver 1501. In this case, a tunable phase shifter is not needed within the signal adjuster 1320.

Figure 4:
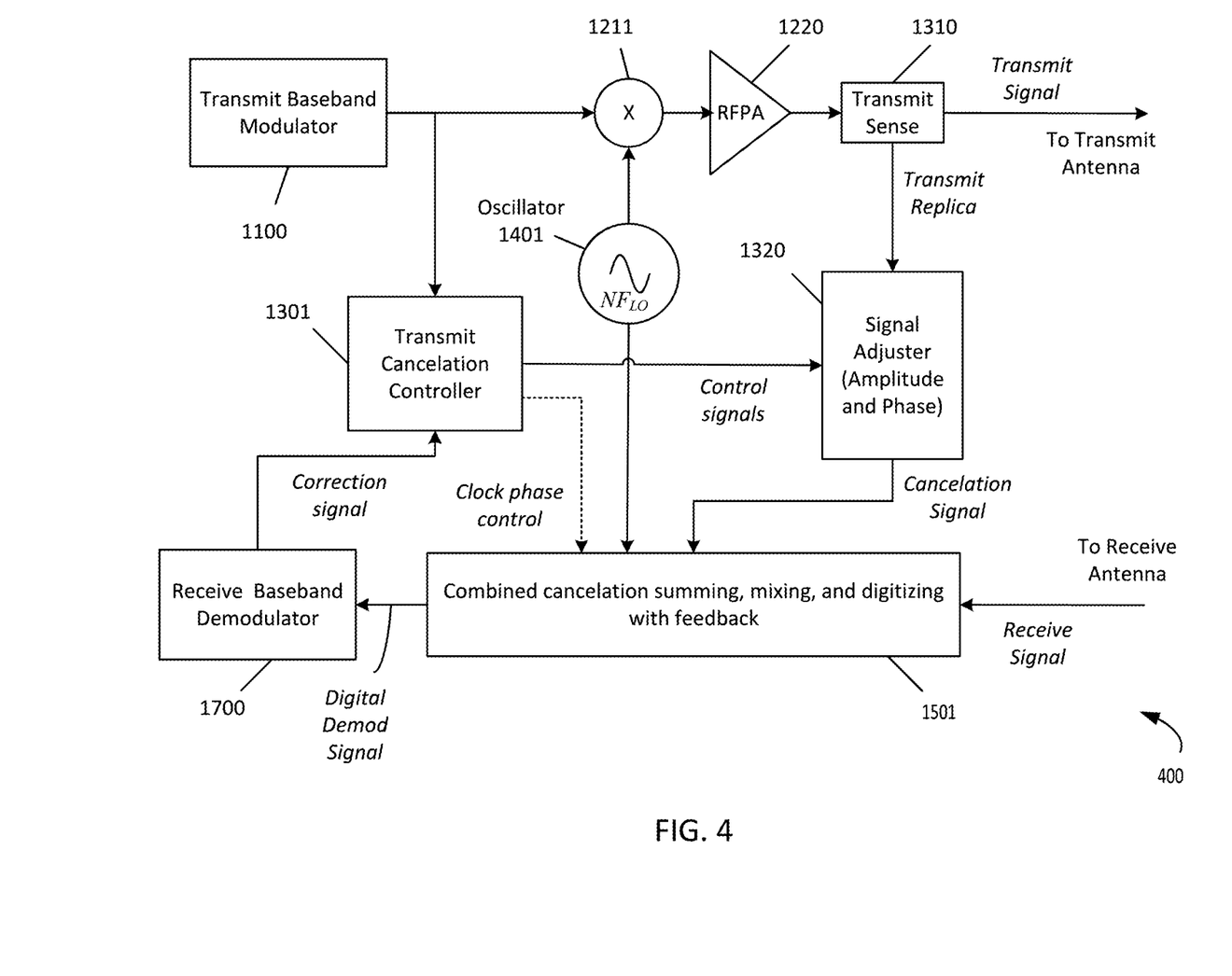
FIG. 4 is a block diagram of an additional example of an RFID reader according to aspects of this disclosure.

FIG. 3 shows a monostatic reader design using the TX-RX coupler 1400 with a single antenna. The TX-RX coupler 1400 interconnects the transmit path and the receive path with a single antenna connection to the line as labeled "To Antenna" in FIG. 3. TX-RX coupler 1400 is further connected to receive the transmit signal from transmit sense circuit 1310 and to provide the receive signal to the integrated noise-canceling RFID receiver 1501. The same or a similar reader design will work using a bistatic arrangement as in FIG. 4. FIG. 4 is a block diagram of an additional example of an RFID reader 400 according to aspects of this disclosure. Reader 400 does not use a TX-RX coupler, but rather separate antennas for transmit and receive. The antenna connection is provided for separate lines as labeled "to transmit antenna" and "to receive antenna," with the former connection being provided to the transmit sense circuit 1310 and the latter connection being provided to the integrated noise-canceling RFID receiver 1501. A reader design such as those shown in FIG. 3 and FIG. 4 will work with a plethora of monostatic or bistatic antenna arrangements using antenna switching circuitry (not shown), regardless of whether the antenna switching is provided by circuits or systems internal or external to the RFID reader.

FIG. 5 is a block diagram of one example of a signal adjuster 1320 that can be used in an RFID reader according to aspects of this disclosure. In this example, the signal adjuster can alter both amplitude and phase adjustment. The amplitude and optionally the phase of the transmit replica signal are adjusted so that the adjusted cancellation signal has approximately equal amplitude to the self-interference signal in the reader. If the phase is adjusted, it is set to be substantially out-of-phase with the self-interference signal component of the received signal. If the cancelation signal is equal in amplitude and 180 degrees out of phase with respect to the self-interference signal, the cancellation signal will significantly reduce or eliminate the self-interference signal in the receiver. Tunable attenuator 1323 may be built from PIN diodes or varactor diodes. Similarly, a tunable phase shifter 1325 may be built from PIN diodes or varactor diodes. The order of the tunable phase shifter 1325 and tunable attenuator 1323 is not important. The phase shifter can come first or second, or the phase shift can optionally be accomplished in other ways such as transmission line length, or by tuning the mixing clock for the cancellation signal mixer in RFID receiver 1501. The amplitude control signal and optional phase control signal shown in FIG. 5 are provided by transmit cancelation controller 1301.

Figure 6:
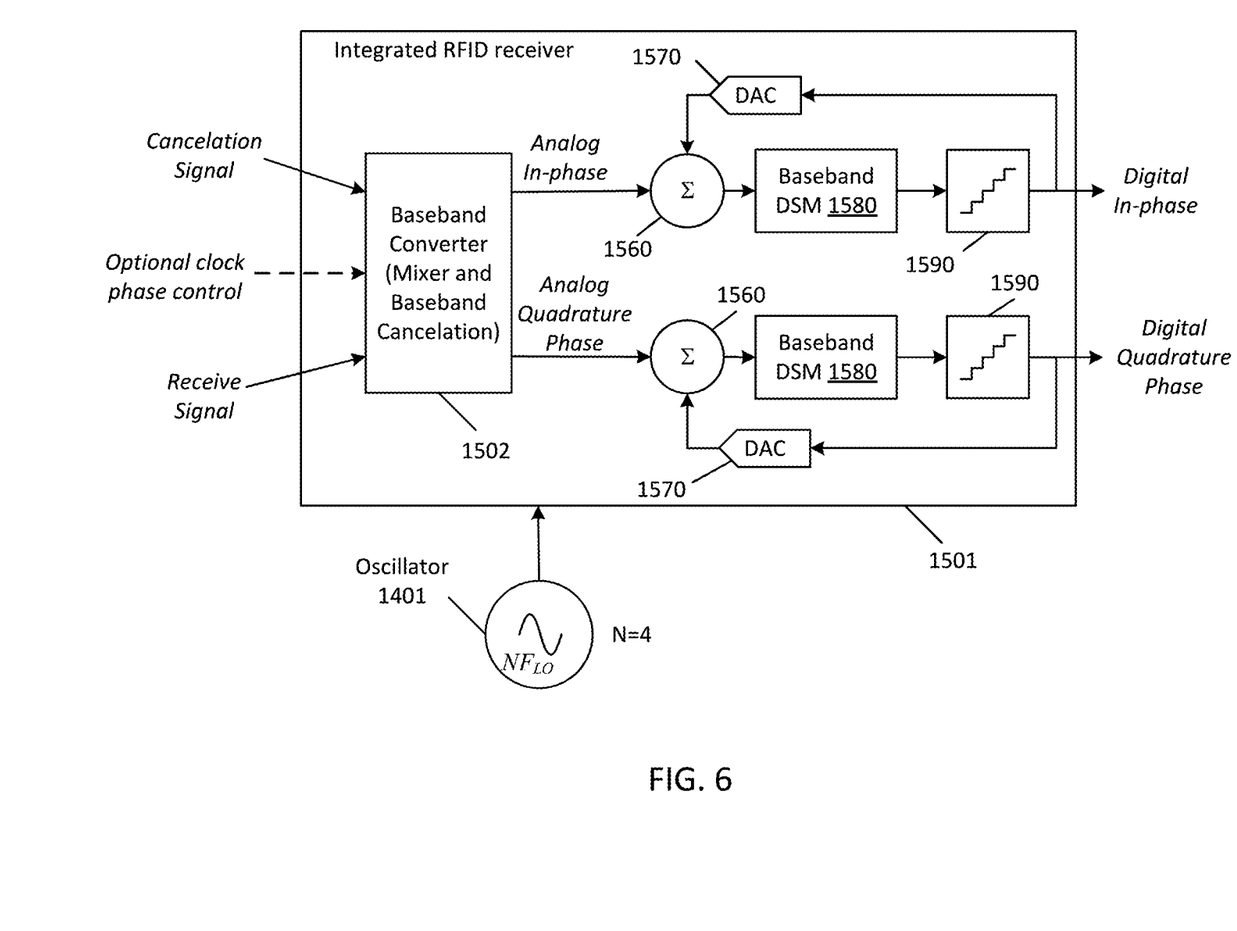
FIG. 6 is a block diagram of one example of an integrated noise-canceling RFID receiver according to aspects of this disclosure.

FIG. 6 is a block diagram of one example of an integrated noise-canceling RFID receiver 1501 according to aspects of this disclosure. This receiver accepts two radio signals, the cancellation signal from the signal adjuster 1320, and the receive signal from the receive antenna, or from the TX-RX coupler 1400 in a monostatic arrangement. These two signals are passed into baseband converter 1502, which provides both mixing and baseband cancellation. Baseband converter 1502 is described in more detail regarding FIG. 7. Circuit 1502 optionally receives, as an additional input, a clock phase control signal from transmit cancelation controller 1301. The baseband converter 1502 produces baseband in-phase and quadrature phase analog signals. These signals in this example follow identical paths through delta-sigma modulation quantization feedback loops including analog summers 1560, which add the analog input with the analog feedback signal in each case from a digital-to-analog converter (DAC) 1570. The output of a summer 1560 is passed to a baseband delta-sigma modulator (DSM) 1580, which optimizes the signal-to-noise ratio of the feedback signal.

Delta-sigma modulation feedback can provide highly oversampled but coarse quantization to shape the quantization noise and push it out of the frequency band of interest. The specific design of the baseband DSM 1580 will be dependent on the RFID reader specifications such as backscatter link frequency and return link modulation. For example, if using FCC-type dense reader modulation of 256 KHz Miller-4, the delta-sigma modulator can be designed for optimum signal-to-noise ratio in an approximately 200 KHz band centered around 256 KHz. The integrated noise-canceling RFID receiver can accommodate arbitrary regulatory requirements and tag backscatter frequencies. The quantizer 1590 can be implemented as a course quantizer whose resolution is improved by the noise shaping and filtering function of the closed-loop DSM feedback path shown in 1501. The integrated noise-canceling RFID receiver results in digital in-phase and quadrature phase baseband outputs for the demodulator of the RFID reader to process.

Figure 7:
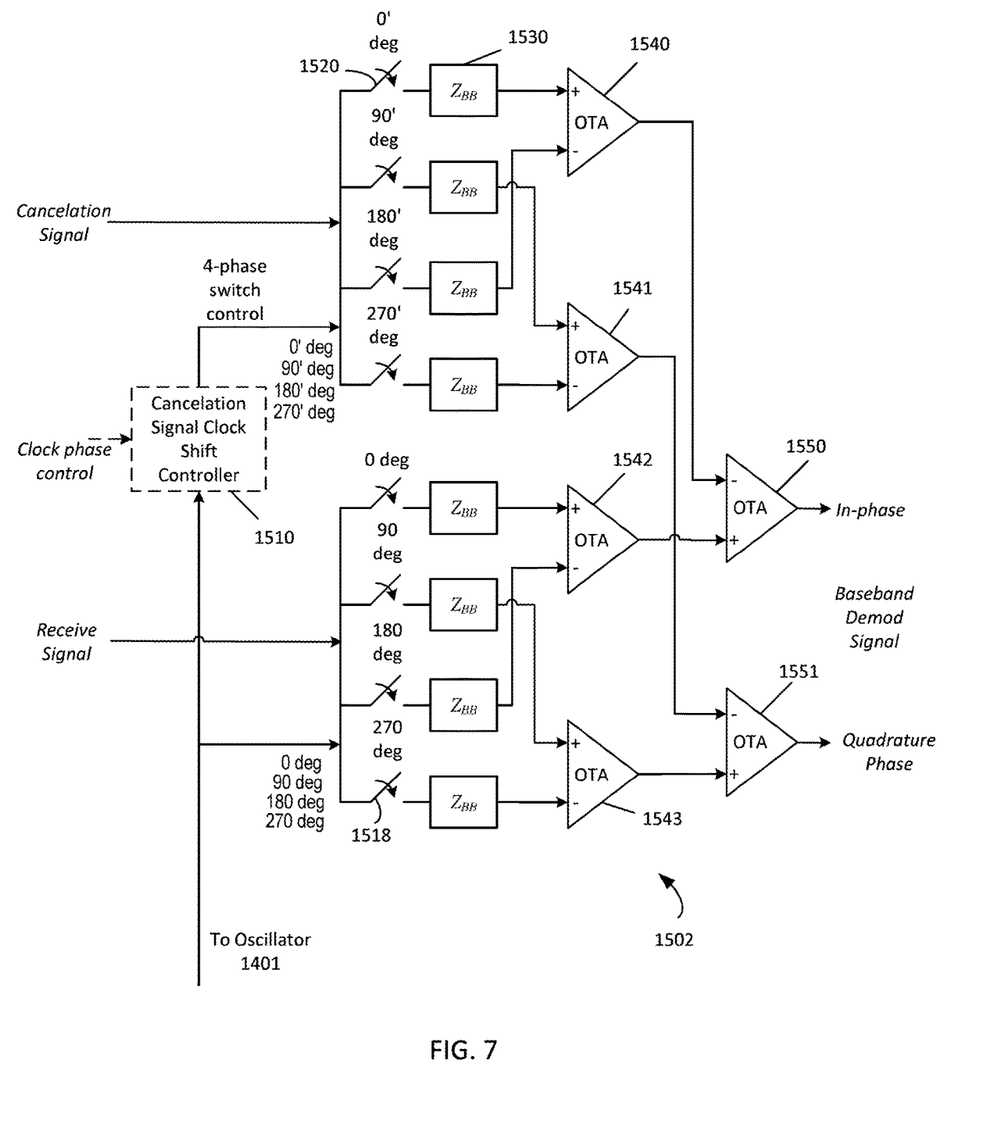
FIG. 7 is a block diagram of one example of a baseband converter that can be used in an integrated noise-canceling RFID receiver according to aspects of this disclosure.

FIG. 7 is a block diagram of one example of baseband converter circuit that can be used in an integrated noise-canceling RFID receiver according to aspects of this disclosure. The baseband converter 1502 provides both receive mixing and interference cancelation. As previously discussed, oscillator 1401 produces an N-phase clock output with the $F_{LO}$ clock period divided into N non-overlapping clock phases to provide the output $NF_{LO}$. In the example of FIG. 7, the value of N is fixed at 4 for oscillator 1401. The four respective phases of the clock are labeled 0 deg, 90 deg, 180 deg, and 270 deg. This clock signal is provided to a first group of four switches 1518 to selectively close the switches. These switches 1518 are shown as ideal switches for illustration purposes, but in practice can be implemented with field effect transistors (FETs) or some other analog switch device. The switches close and remain closed through their respective clock phase, then open.

The baseband impedance 1530 is designed to provide the desired radio frequency selectivity. In this example, the baseband impedance circuit ZBB 1530 provides impedance-translated up to the carrier frequency $F_{LO}$. In some examples, the baseband impedance can be provided by an RC filter, but other filter designs can be used. The complex impedance 1530 forms an integrator over the period the respective switch 1518 is closed. When the switch opens, the voltage is held because the impedance of the open switch 1518 and the input of the operational transconductance amplifiers (OTAs) 1542 and 1543 is very high. The OTA circuits, for example, use high input impedance, differential input amplifiers, which produce a current output proportional to the difference in input voltage. Other types of differential amplifiers can be used. The frequency translation behavior of the baseband impedance 1530 includes translation to a passband impedance referenced to the input around the RF carrier frequency. This passband impedance performs the filtering function of a fixed-band RF input filter, but the filter described here moves with the carrier frequency, providing a radio with a front-end filter that automatically tracks, or moves around with, the carrier frequency.

Circuit 1502 accepts the optional clock cancelation control signal from transmit cancelation controller 1301. This signal controls the optional cancellation signal clock shift controller 1510. Circuit 1510 accepts the oscillator input from 1401 and delays the clock phases to create a phase shift in the baseband cancellation signal OTA outputs based on the clock cancelation control signal. In this case, the clock phase signals 0' deg, 90' deg, 180' deg, and 270' deg are shifted in time relative to the 0 deg, 90 deg, 180 deg, and 270 deg inputs, and provided to selectively close a second group of switches 1520, which may each be identical to those of the first group of switches 1518. Around one degree of phase resolution is enough for adequate performance in this example. Clock shift controller 1510 may be implemented by a precision digital delay circuit such as a tapped delay line or in any other way. The passive switch mixer based on the switches 1520 and impedances 1530 has very high linearity as compared to active mixers (second order intercept, third order intercept, intermod products, etc.).

Continuing with FIG. 7, OTA 1540 produces the in-phase baseband cancellation signal, and OTA 1541 produces the quadrature phase baseband cancellation signal. OTA 1542 produces the in-phase baseband receive signal, and OTA 1543 produces a quadrature phase baseband receive signal. OTA 1550 subtracts the in-phase cancellation signal from the in-phase receive signal. OTA 1551 subtracts the quadrature-phase cancellation signal from the quadrature-phase receive signal. The result is a baseband, analog demodulation input signal.

Figure 8:
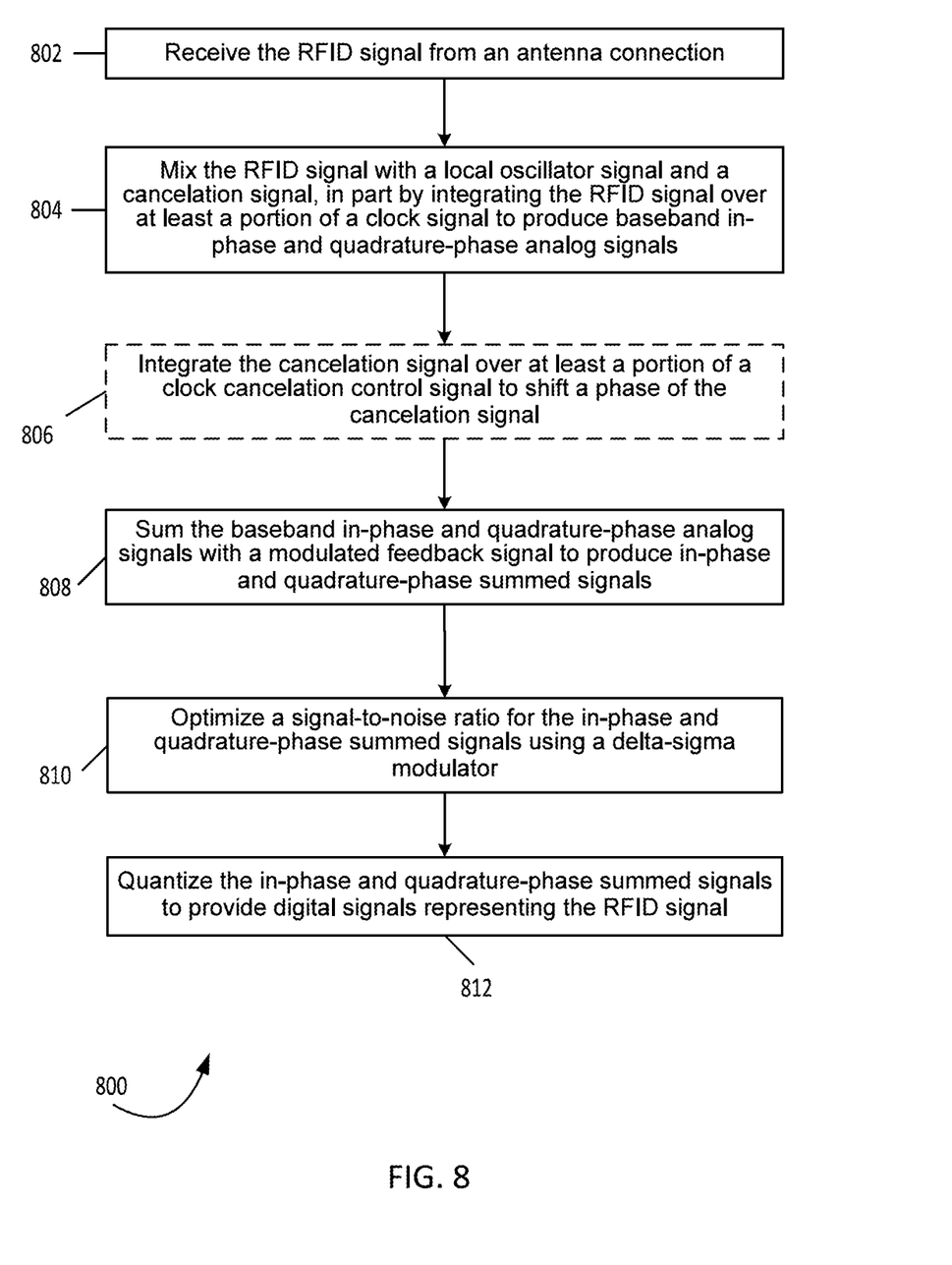
FIG. 8 is a flowchart of one example of a method of processing a received RFID signal according to aspects of this disclosure.

FIG. 8 is a flowchart of one example of a process 800 of operating an integrated noise-canceling RFID receiver according to aspects of this disclosure. Process 800 makes use of the features and circuits already discussed, and the operation of the system may be controlled by suitable processor, such as a DSP. At block 802, and RFID reader such as RFID reader 1000, receives and RFID signal through an antenna connection. At block 804, the reader mixes the RFID signal with a local oscillator signal and the cancellation signal. This mixing may be accomplished, as an example, using baseband converter 1502. The signals are mixed in part by integrating the RFID signal over at least a portion of the clock signal to produce baseband in-phase and quadrature-phase analog signals. The switches 1518 and connected impedances can be used to integrate the signal.

At block 806, the reader optionally integrates the cancelation signal over at least a portion of a clock cancelation control signal to shift a phase of the cancellation signal in order to provide more complete noise cancellation. This integration may be provided by switches 1520 and connected impedances. At block 808, the reader sums the baseband in-phase and quadrature-phase analog signals with a feedback signal to produce in-phase and quadrature-phase summed signals. Summers 1560 may be used to sum these signals. At block 810, the reader optimizes the signal-to-noise ratio for the in phase and quadrature phase some signals, for example, using delta-sigma modulators 1580 to provide the modulated feedback signals. At block 812, the reader quantizes the in-phase and quadrature-phase summed signals to provide digital signals representing the RFID signal.

The reader described as an example in this disclosure may be implemented using a discrete component RFID reader design, such as one based on physically separate chips for DACs, ADCs, mixers, amplifiers, couplers, and the like. A processing function for a reader, as well as additional functional bocks or circuits in the reader can be implemented on a field programmable gate array (FPGA), or on an application specific integrated circuit (ASIC). A reader may also be implemented as a system-on-a-chip (SoC), wherein many of the subsystems are integrated together on a chip. Sometimes multichip SoC solutions can be used to ease manufacturability given the variations in process, which may be required based on frequency, power, and the like.

In order to implement some of the functions of the RFID reader 1000, a general-purpose processor such as DSP, a microcontroller, an embedded controller, or a microprocessor can be used and firmware, software, or microcode can be stored in a tangible or non-transitory storage medium such as a memory that is associated with a processor. Such a storage medium may be a memory integrated into the processor, or may be a memory chip that is addressed by the processor to perform control functions. Such firmware, software or microcode includes instructions executable by the processor and when executed, cause the processor to perform its functions for operating the RFID reader. Such firmware or software can also be stored in or on a tangible medium such as an optical disk or traditional removable or fixed magnetic medium such as a disk drive used to load the firmware or software into an RFID reader. The firmware, software, or microcode may control the various hardware components or circuits in the reader, whether discrete, integrated, or virtual (implement by a DSP), in order to send and receive RFID signals and provide the noise control described herein.

Features referred to as "controllers," "mixers," "filters," "oscillators," "clocks," and the like may be implemented as discrete or integrated circuits, or virtual circuits emulated by a DSP or other suitable processor, irrespective of whether the term "circuit" is used in the description herein. Components that are referred to herein as "connected," "communicatively coupled," or the like may be connected or coupled directly or through intervening components.

The foregoing description of the examples, including illustrated examples, has been presented only for the purpose of illustration and description and is not intended to be exhaustive or to limit the subject matter to the precise forms disclosed. Numerous modifications, combinations, adaptations, uses, and installations thereof can be apparent to those skilled in the art without departing from the scope of this disclosure. The illustrative examples described above are given to introduce the reader to the general subject matter discussed here and are not intended to limit the scope of the disclosed concepts.

What is claimed is:

1. A radio frequency identification (RFID) receiver comprising:
   a baseband converter configured to receive an RFID signal and a cancelation signal, the baseband converter configured to provide mixing and cancelation to produce an analog baseband signal;
   a summer communicatively coupled to the baseband converter and configured to receive the analog baseband signal and a modulated feedback signal; and
   a quantizer communicatively coupled to the summer to produce a digital baseband signal corresponding to the RFID signal using closed-loop noise control based on the modulated feedback signal.

2. The RFID receiver of claim 1, further comprising a delta-sigma modulator communicatively coupled between the summer and the quantizer and configured to produce the modulated feedback signal.

3. The RFID receiver of claim 1, wherein the baseband converter is further configured to receive a clock cancelation control signal and to use the clock cancelation control signal and a clock signal to provide cancelation signal phase shifting.

4. The RFID receiver of claim 1, wherein the baseband converter further comprises:
   a first plurality of switches configured to receive the RFID signal, each of the first plurality of switches selectively closed based on a respective phase of a clock signal;
   a plurality of baseband impedance circuits, at least some of the plurality of baseband impedance circuits communicatively coupled to the first plurality of switches to form an integrator for the respective phase of the clock signal; and
   one or more operational amplifiers communicatively coupled to the plurality of baseband impedance circuits and configured to produce the analog baseband signal.

5. The RFID receiver of claim 4, further comprising a second plurality of switches communicatively configured to receive the cancelation signal and communicatively coupled to the plurality of baseband impedance circuits, each switch of the second plurality of switches selectively closed based on a clock cancelation control signal.

6. The RFID receiver of claim 1, wherein the baseband converter is configured to provide front-end filtering that automatically tracks a carrier frequency.

7. A radio frequency identification (RFID) reader comprising:
   an antenna connection;
   a modem to modulate a transmitted RFID signal and demodulate a received RFID signal;
   a transmit mixer communicatively coupled to the modem;
   a radio frequency power amplifier (RFPA) communicatively coupled between the transmit mixer and the antenna connection; and
   an integrated noise-canceling RFID receiver communicatively coupled between the antenna connection and the modem, the integrated noise-canceling RFID receiver configured to use a cancelation signal and a modulated feedback signal for closed-loop noise control.

8. The RFID reader of claim 7, further comprising:
   a transmit sense circuit communicatively coupled to the RFPA; and
   a signal adjuster communicatively coupled between the transmit sense circuit and the integrated noise-canceling RFID receiver, the signal adjuster configured to produce to the cancelation signal.

9. The RFID reader of claim 8, wherein the signal adjuster further comprises:
   an attenuator configured to receive a replicated transmit signal; and
   a tunable phase shifter communicatively coupled to the attenuator and configured to produce the cancelation signal.

10. The RFID reader of claim 8, further comprising a transmit cancelation controller communicatively coupled between modem and the signal adjuster.

11. The RFID reader according to claim 7, wherein the integrated noise-canceling RFID receiver further comprises:
    a baseband converter configured to receive the cancelation signal, the baseband converter configured to provide mixing and cancelation based on the cancelation signal to produce an analog baseband signal;
    a summer communicatively coupled to the baseband converter and configured to receive the analog baseband signal and the modulated feedback signal; and
    a quantizer communicatively coupled to the summer and configured to produce a digital baseband signal.

12. The RFID reader of claim 11, further comprising an oscillator communicatively coupled between the transmit mixer and the baseband converter.

13. The RFID reader of claim 12, further comprising a delta-sigma modulator communicatively coupled between the summer and the quantizer, the delta-sigma modulator configured to produce the modulated feedback signal.

14. The RFID reader of claim 12, wherein the baseband converter is further configured to receive a clock cancelation control signal and to use the clock cancelation control signal and a clock signal to provide cancelation signal phase shifting.

15. The RFID reader of claim 12, wherein the baseband converter further comprises:
- a first plurality of switches, each of the first plurality of switches selectively closed based on a respective phase of a clock signal;
- a plurality of baseband impedance circuits, at least some of the plurality of baseband impedance circuits communicatively coupled to the first plurality of switches to form an integrator for the respective phase of the clock signal; and
- one or more operational amplifiers communicatively coupled to the plurality of baseband impedance circuits and configured to produce the analog baseband signal.

16. The RFID reader of claim 15, further comprising:
- a second plurality of switches configured to receive the cancelation signal and communicatively coupled to the plurality of baseband impedance circuits, each of the second plurality of switches selectively closed based on a clock cancelation control signal.

17. A method of processing an RFID signal, the method comprising:
- receiving the RFID signal through an antenna connection;
- mixing the RFID signal with a local oscillator signal and a cancellation signal to produce baseband in-phase and quadrature-phase analog signals;
- summing the baseband in-phase and quadrature-phase analog signals with a modulated feedback signal to produce summed in-phase and quadrature-phase signals;
- optimizing a signal-to-noise ratio for the summed in-phase and quadrature-phase signals; and
- quantizing the summed in-phase and quadrature-phase signals to provide in-phase and quadrature-phase digital signals representing the RFID signal.

18. The method of claim 17, wherein optimizing the signal-to-noise ratio comprises optimizing the signal-to-noise ratio using a delta-sigma modulator.

19. The method of claim 17, wherein mixing the RFID signal with a local oscillator signal and a cancellation signal further comprises integrating the RFID signal over at least a portion of a clock signal.

20. The method according to claim 17, further comprising integrating the cancelation signal over at least a portion of a clock cancelation control signal to shift a phase of the cancelation signal.

* * * * *